(12) United States Patent
Tavi et al.

(10) Patent No.: US 8,730,338 B2
(45) Date of Patent: May 20, 2014

(54) SET OF CAMERA MODULES HINGED ON A BODY AND FUNCTIONALLY CONNECTED TO A SINGLE ACTUATOR

(75) Inventors: Tommi Tavi, Tampere (FI); Samu Koskinen, Tampere (FI); Ville Nummela, Helsinki (FI); Wing Kei Tang, San Diego, CA (US)

(73) Assignee: Nokia Corporation, Espoo (FI)

(*) Notice: Subject to any disclaimer, the term of this patent is extended or adjusted under 35 U.S.C. 154(b) by 585 days.

(21) Appl. No.: 12/628,532

(22) Filed: Dec. 1, 2009

(65) Prior Publication Data
US 2011/0128393 A1 Jun. 2, 2011

(51) Int. Cl.
*H04N 5/225* (2006.01)
*H04N 7/00* (2011.01)

(52) U.S. Cl.
USPC .......................................... 348/218.1; 348/36

(58) Field of Classification Search
USPC .................. 348/218.1, 153, 36–37, 159, 157, 348/207.99, 211.11, 211.12, 211.13, 53, 348/169, 201, 240.99, 211.9, 211.7
See application file for complete search history.

(56) References Cited

U.S. PATENT DOCUMENTS

| | | | |
|---|---|---|---|
| 5,475,422 A * | 12/1995 | Mori et al. | 348/48 |
| 6,674,461 B1 * | 1/2004 | Klapman | 348/42 |
| 2006/0181610 A1 * | 8/2006 | Carlsson et al. | 348/159 |
| 2008/0225129 A1 | 9/2008 | Viinikanoja et al. | |

* cited by examiner

*Primary Examiner* — Ahmed A Berhan
(74) *Attorney, Agent, or Firm* — Locke Lord LLP (57) ABSTRACT

An apparatus, method and computer program, in which there is provided an apparatus with a body, which apparatus has a set of camera modules mounted on the body, each camera module configured to take images with a first field of view and an adjustment mechanism configured to move the camera modules between a first configuration and a second configuration. In the first configuration, each camera module shares a substantially common field of view that covers a first view area. In the second configuration, the fields of view of the camera modules collectively form a second view area that is continuous and covers a second view area. A zoom-in image is formed in the first configuration using super-resolution combining of the images taken by the camera modules.

17 Claims, 5 Drawing Sheets

SET OF CAMERA MODULES HINGED ON A BODY AND FUNCTIONALLY CONNECTED TO A SINGLE ACTUATOR

TECHNICAL FIELD

The present application generally relates to digital imaging.

BACKGROUND ART

Digital cameras have been developed based on film based cameras. Digital cameras are based on optical lens systems that operate based on basic laws of optics. For instance, the lens system has a particular field of view that generally depends on the focal length of the lens system. The field of view desired by a user depends on the situation and preferences of the user. In-door pictures are often taken with broader field of view in order to fit proximate subjects in a common picture. Zooming in with a zoom lens or replacing a lens to one with higher focal length is used to enlarge the subject of an image, particularly when photographing distant objects or when willing to emphasize a particular detail of the subject. The zoom lens normally works such that different lenses are mounted on different cylindrical parts that are distanced or approached with respect to each other to change to focal length of the lens.

In film cameras, the aspect ratio of pictures depended on the form of one film exposure ratio. However, the aspect ratio has been changed in post processing by cropping taken pictures to desired aspect form. With digital cameras, aspect ratio is changed in some models by cropping an image either when recording the image or after the image is taken.

SUMMARY

According to a first example aspect of the invention there is provided an apparatus comprising:
  a body;
  a set of camera modules mounted on the body, each camera module configured to take images with a first field of view;
  an adjustment mechanism configured to move the camera modules between a first configuration and a second configuration, wherein:
  in the first configuration, each camera module shares a substantially common field of view that covers a first view area; and
  in the second configuration, the fields of view of the camera modules collectively form a second view area that is continuous and covers a second view area, wherein the second view area has common aspect ratio with the first view area and the second view area is larger than the first view area.

The apparatus may further comprise:
  a memory configured to store images taken by the camera modules; and
  a processor configured to form a zoom-in image in the first configuration from the images stored in the memory corresponding to the images of the camera modules using super-resolution combining of the stored images.

The processor may be further configured to form a zoom-out image in the second configuration from the images stored in the memory corresponding to the images of the camera modules.

The forming of the zoom-out image may further comprise mapping images taken by different camera modules to a common zoom-out image based on knowledge of relative angles between the different camera modules.

The adjustment mechanism may further be configured to move the camera modules between the first and second configuration via one or more intermediate configurations in which the camera modules collectively produce a partly zoomed image with a third view area that is larger than the first view area and smaller than the second view area.

The processor may be configured to apply super-resolution combining of images taken by the camera modules in overlapping parts of the partly zoomed image within the third view area.

The processor may further be configured to apply interpolation to non-overlapping parts of the partly zoomed image in the third view area.

The adjustment mechanism may be configured to tilt the camera modules apart to change the camera modules from the first configuration to the second configuration. The tilting may be configured to take place to corresponding extent in both X and Y directions.

The set of camera modules may comprise a number of camera modules that is the square of an integer greater than 1. The camera modules may be grouped as a square or as a rectangle.

The adjustment mechanism may be further configured to adjust aspect ratio by selective tilting of the camera modules.

The adjustment mechanisms may comprise individual angle adjusting elements for at least two of the camera modules.

The adjustment mechanism may be configured to maintain, while changing configuration from the first configuration to the second configuration, the field of view of each of the camera modules at least partly overlapping with the field of view of at least one other camera module. The apparatus may be further configured to correlate the mutual alignment of the fields of view of the different camera modules in the set by correlating overlapping parts of images captured by the camera modules.

The adjustment mechanism may comprise a single actuator configured to cause changing of the set of camera modules between the first configuration and the second configuration. The camera modules of the set may be configured to surround the single actuator. The camera modules may be configured to tilt synchronously responsive to action of the single actuator.

The camera modules of the set may be hinged at one side and functionally connected to the actuator at opposing side.

The adjustment mechanism may comprise a stepper motor. Alternatively or additionally, the adjustment mechanism may comprise a piezo-electrical actuator. Further alternatively or additionally, the adjustment mechanism may comprise a pneumatic actuator. The adjustment mechanism may further comprise a pneumatically connected pressure inducer configured to receive force from the user and to respectively produce pressure to adjust the camera modules between the first and second configuration.

The apparatus may further comprise a mobile communication circuitry configured to provide mobile communications functions. The mobile communication circuitry may be further configured to receive a photo image taken collectively with the camera modules and to relay the photo image to a remote recipient.

The mobile communication circuitry may be configured to provide land mobile telecommunication service, satellite telecommunication service or landline telecommunication service.

According to a second example aspect of the invention there is provided a method comprising:

moving camera modules of a set of camera modules between a first configuration and a second configuration, wherein the camera modules are supported on body and each camera module is configured to take images with a first field of view; and wherein:

in the first configuration, each camera module shares a substantially common field of view that covers a first view area; and in the second configuration, the fields of view of the camera modules collectively form a second view area that is continuous and covers a second view area, wherein the second view area has common aspect ratio with the first view area and the second view area is larger than the first view area.

The method may further comprise:

storing in a memory images taken by the camera modules; and forming a zoom-in image in the first configuration from the images stored in the memory corresponding to the images of the camera modules using super-resolution combining of the stored images.

The method may further comprise forming a zoom-out image in the second configuration from the images stored in the memory corresponding to the images of the camera modules.

The method may further comprise moving the camera modules between the first and second configuration via one or more intermediate configurations in which the camera modules collectively produce a partly zoomed image with a third view area that is larger than the first view area and smaller than the second view area.

The method may further comprise applying super-resolution combining of images taken by the camera modules in overlapping parts of the partly zoomed image within the third view area.

The method may further comprise applying interpolation to non-overlapping parts of the partly zoomed image in the third view area. Alternatively, the method may further comprise encoding the partly zoomed image with variable resolution so that non-overlapping parts of the partly zoomed image are encoded with a resolution lower than at super-resolution combined parts of the partly zoomed image.

The forming of the zoom-out image may further comprise mapping images taken by different camera modules to a common zoom-out image based on knowledge of relative angles between the different camera modules.

The method may further comprise tilting the camera modules apart to change the camera modules from the first configuration to the second configuration. The tilting may be configured to take place to corresponding extent in both X and Y directions.

The set of camera modules may comprise a number of camera modules that is the square of an integer greater than 1. The camera modules may be grouped as a square or as a rectangle.

The method may further comprise adjusting aspect ratio by selective tilting of the camera modules.

The method may further comprise individual tilting of at least two of the camera modules.

The method may further comprise maintaining, while changing configuration from the first configuration to the second configuration, the field of view of each of the camera modules at least partly overlapping with the field of view of at least one other camera module. The method may further comprise correlating the mutual alignment of the fields of view of the different camera modules in the set by correlating overlapping parts of images captured by the camera modules.

The method may further comprise using a single actuator to cause changing of the set of camera modules between the first configuration and the second configuration.

The method may further comprise synchronously tilting the camera modules responsive to action of the single actuator.

The camera modules of the set may be hinged at one side and functionally connected to the actuator at opposing side.

The method may further comprise obtaining a photo image taken collectively with the camera modules and relaying the photo image to a remote recipient.

According to a third example aspect of the invention there is provided a computer executable program comprising computer executable program code, which when executed by a computer, causes the computer to cause an apparatus to perform any method according the second example aspect.

The computer program may be stored in a memory medium. The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
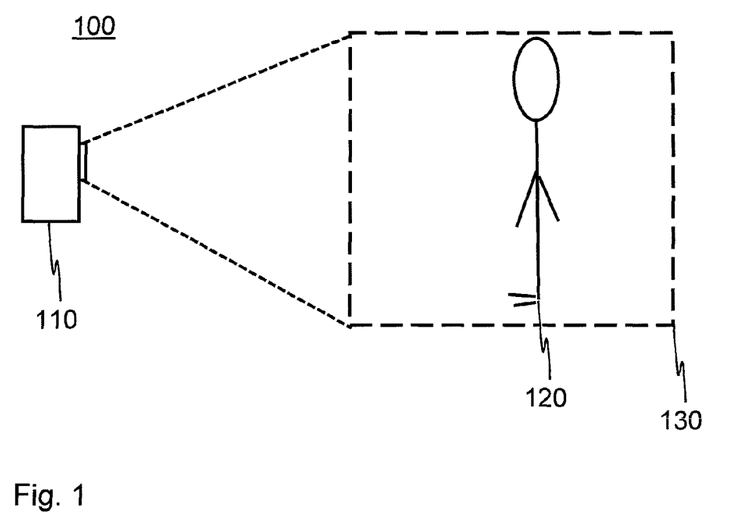
FIG. 1 shows a schematic drawing of a system according to an example embodiment of the invention.

FIG. 1 shows a schematic drawing of a system 100 according to a first example embodiment of the invention. The system 100 comprises an apparatus 100 that is capable of taking photographs and an image subject 120. FIG. 1 further shows a view area 130 from which the apparatus 100 may take a photographic image.

In a second example embodiment of the invention applicable with the first example embodiment of the invention, the apparatus 100 is a camera unit for a host device. The host device comprise a mobile phone, a personal digital assistant, a door phone, a surveillance camera unit, a vehicle mounted camera unit such as a reversing aid camera, a digital camera, a portable game apparatus or a video conference camera.

In a third example embodiment of the invention applicable with the first example embodiment of the invention, the apparatus 100 is configured to operate as one of the following: a mobile phone, a personal digital assistant, a door phone, a surveillance camera unit, a vehicle mounted camera unit such as a reversing aid camera, a digital camera, a portable game apparatus or a video conference camera.

Figure 2:
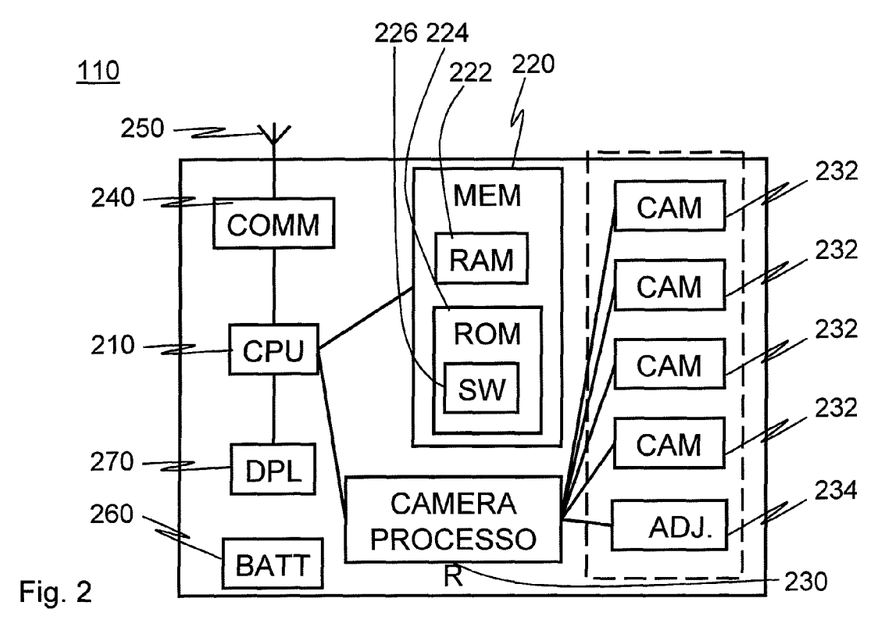
FIG. 2 shows a block diagram of an apparatus according to an example embodiment of the invention.

FIG. 2 shows a block diagram of an apparatus 110 according to a fourth example embodiment of the invention. In sake of exemplifying various some embodiments of the invention, FIG. 2 also depicts blocks that are not present in some other embodiments. Hence, alike the whole description, the description of FIG. 2 is also to be understood as description of some example structures that may be omitted, replaced by other structures or supplemented by structures that are not expressly described in this context. The fourth example embodiment may be understood illustrative of the third example embodiment where the apparatus is a mobile phone. The apparatus 110 comprises a main processor 210 in general control of different functions of the apparatus 110. Moreover, the apparatus 110 comprises a memory 220 with a work memory 222 and a non-volatile memory 224 that stores software or operating instructions. Further, the apparatus has a camera processor 230 for controlling camera specific operations, an array of camera modules 232 and an adjustment mechanism 234 that may be controlled by the camera processor 230. For communications, the apparatus 110 comprises a communication unit 240 and an antenna 250. A battery 260 may be provided for mobile operation. For use as a viewfinder and/or for displaying instructions and/or presenting different prompts for a user, the apparatus 110 may comprise a display 270.

The main processor 210 may comprise, for instance, one or more master control processor, central processing unit, and/or digital signal processor. Moreover, the main processor 210 and the camera processor may be integrally formed while presented as logically separate blocks in FIG. 2.

The work memory 222 may comprise, for instance, random access memory, video random access memory or dynamic random access memory.

The non-volatile memory 224 may comprise flash-ram, electronically erasable read only memory, hard disk, hard disk array, optical storage, memory stick, memory card and/or magnetic memory.

The software may comprise operating system, device drivers, program libraries, program interpreters, interpreting software platforms, binary applications, scripts, applets, macros and/or applications.

The camera processor may comprise a central processing unit, master control unit, a digital signal processor, a field-effect gate transistor array, an application specific integrated circuit.

The camera module 232 may comprise an image capturing unit (not shown in FIG. 2) such as, for instance, charge-coupled cells, complementary metal-oxide-semiconductor, active pixel sensor, wiring and communication bus circuitry.

The camera module 232 may further comprises a lens system (not shown in FIG. 2) formed of one or more lenses and a casing for holding together the image capture unit and the lens system.

The adjustment mechanism 234 may comprise a stepper motor. Alternatively or additionally, the adjustment mechanism may comprise a piezo-electrical actuator. Further alternatively or additionally, the adjustment mechanism may comprise a pneumatic actuator. The adjustment mechanism may further comprise a pneumatically connected pressure inducer configured to receive force from the user and to respectively produce pressure to adjust the camera modules between the first and second configuration.

The communication unit 240 may comprise a landline communication unit and/or a mobile communication unit. The communication unit may comprise, for instance, a unit configured to enable communications in one or more of the following: a global system for mobile communications; personal digital cellular; Interim Standard 95, CDMA 2000, W-CDMA, wireless local area network; Bluetooth™; optical; and acoustic communication systems.

Figure 3A:
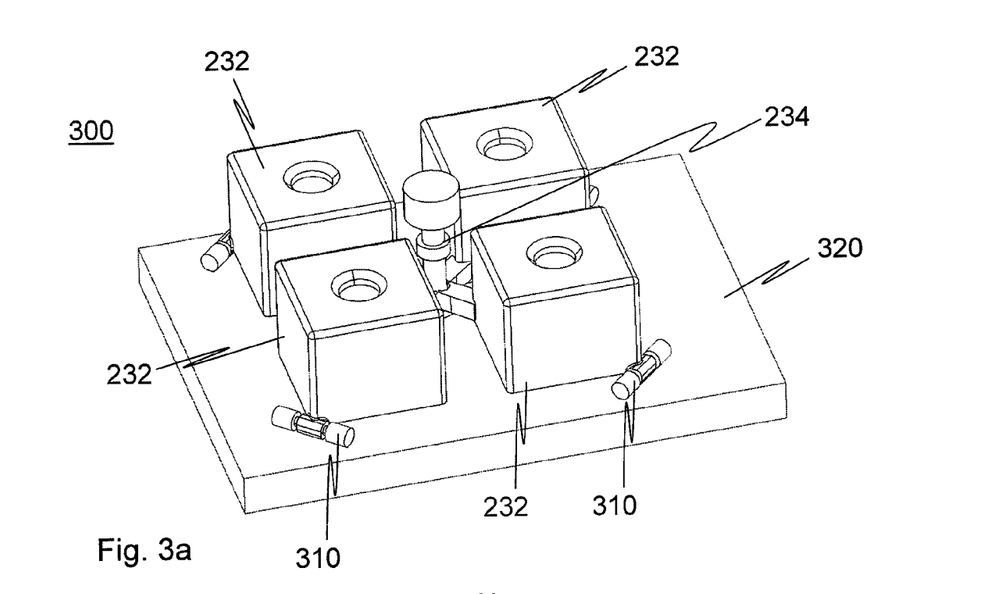
FIG. 3a shows a three-dimensional illustration of details of an assembly in a first configuration according to an example embodiment of the invention.
Figure 3B:
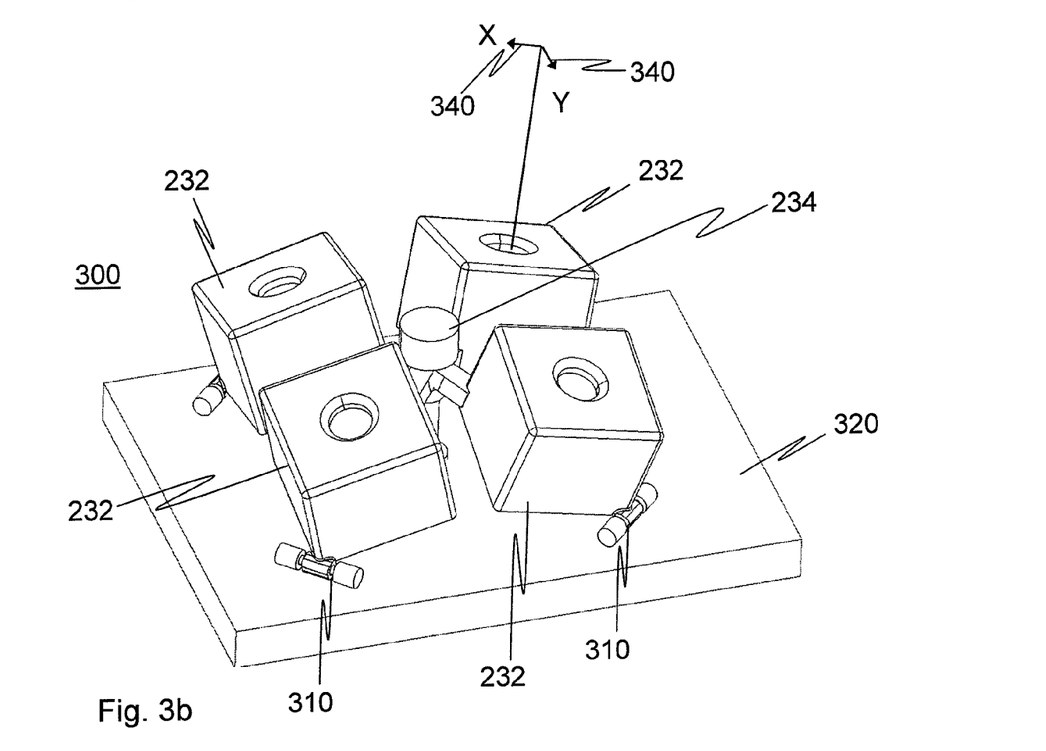
FIG. 3b shows a three-dimensional illustration of details of the assembly of FIG. 3a in a second configuration.

FIG. 3a shows a three-dimensional illustration of details of an assembly in a first configuration according to a fifth example embodiment of the invention applicable with any one of the first to fourth example embodiments. FIG. 3b shows a three-dimensional illustration of details of the assembly of FIG. 3a in a second configuration. The assembly comprises:

- a body 320;
- a set of camera modules 232 mounted on the body, each camera module configured to take images with a first field of view (e.g. references 510 to 540 in FIGS. 5a to 5c);
- an adjustment mechanism 234 configured to move the camera modules 232 between a first configuration (as shown in FIG. 3a) and a second configuration (as shown in FIG. 3b), wherein:
- in the first configuration, each camera module shares a substantially common field of view (e.g. references 510 to 540 in FIG. 5a) that covers a first view area (e.g. reference 550 in FIG. 5a); and
- in the second configuration, the fields of view (e.g. references 510 to 540 in FIG. 5a) of the camera modules collectively form a second view area (e.g. reference 550 in FIG. 5a) that is continuous and covers a second view area,
- wherein the second view area has common aspect ratio with the first view area and the second view area is larger than the first view area.

FIG. 3a and FIG. 3b also show how the camera modules 232 are supported to the body 320 so that the camera modules 232 can be diverged and converged to change the configuration between the first and second configurations. The camera modules 232 may be pivotably attached to the body 320 with hinges 310. FIG. 3b—and also FIG. 4b—show exaggerated angles between the camera modules to better illustrate possible structures usable to implement the adjustment mechanism 234. As is readily apparent from FIGS. 3a, 3b, 4a and 4c, the moving of the camera modules 232 by tilting may require sliding at either or both of an attachment between the camera module 323 and the adjustment mechanism 234 and an attachment between the camera module and a hinge. In FIGS. 3a and 3b, there is leeway at the attachment by the adjustment mechanism 234 whereas in FIGS. 4a and 4b, a hinge 310' is slideably mounted on a rail 415. Alternatively, it is appreciated that the camera modules may be mounted on suitably curved rails or on pivotable arms such that the angle between the camera modules is adjusted by changing offset between adjacent camera modules. The fifth example embodiment provides a relatively shallow camera module array. It is also appreciated that in some implementations, such as camera systems of mobile phones, the depth is often more important that lateral dimensions.

Figure 4A:
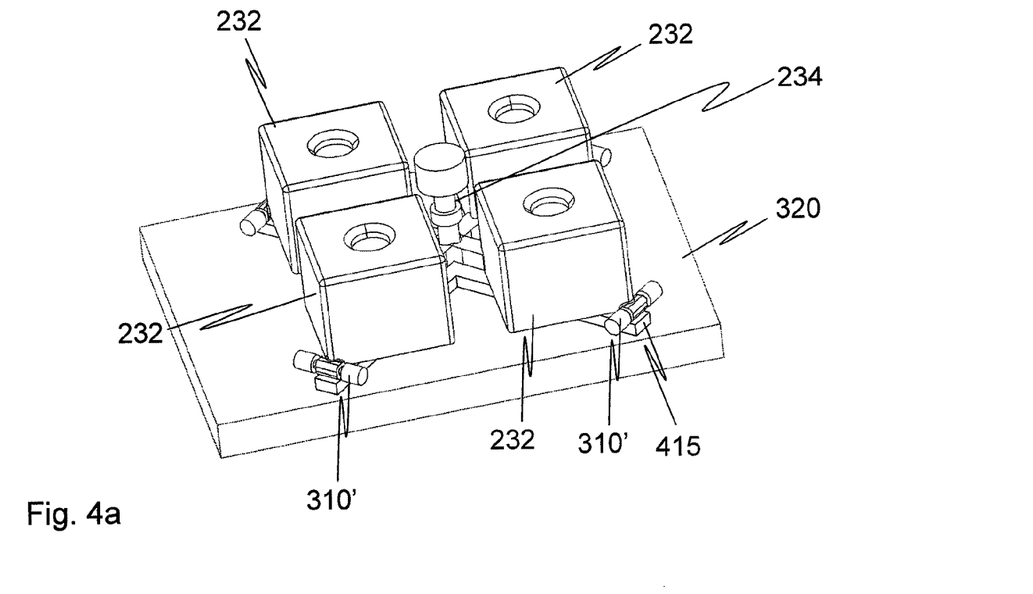
FIG. 4a shows a three-dimensional illustration of details of an assembly in a first configuration according to an example embodiment of the invention.
Figure 4B:
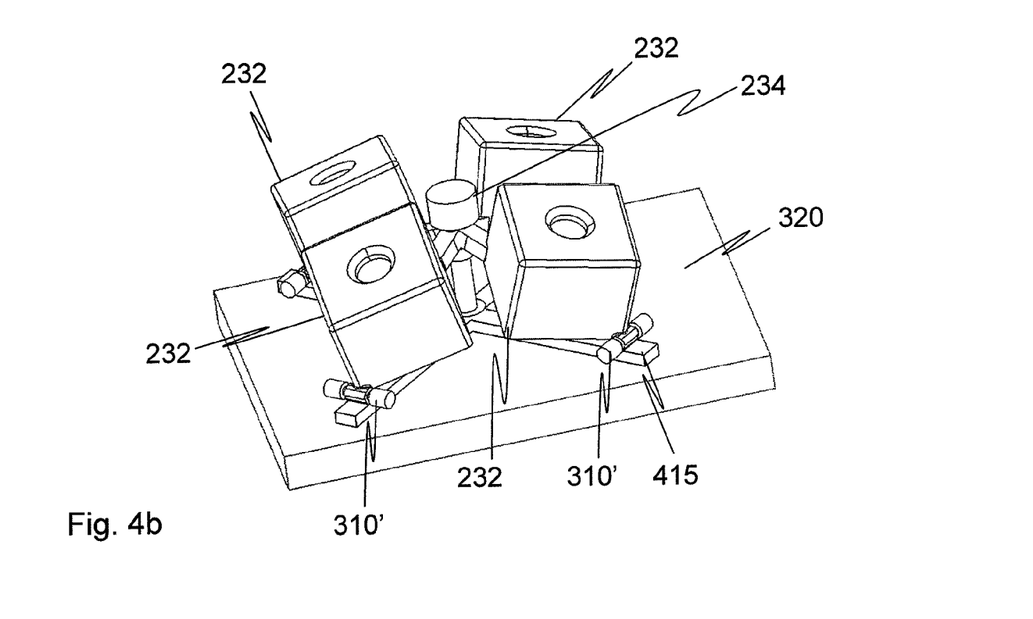
FIG. 4b shows a three-dimensional illustration of details of the assembly of FIG. 4a in a second configuration.

FIG. 4a shows a three-dimensional illustration of details of an assembly in a first configuration according to a sixth example embodiment of the invention applicable with any one of the first to fourth example embodiments and FIG. 4b shows a three-dimensional illustration of details of the assembly of FIG. 4a in a second configuration. FIGS. 4a and 4b differ from FIGS. 3a and 3b by the implementation of the adjustment mechanism 234 that here is implemented by producing sliding at the hinged side of the camera modules 232 with hinges 310' that slide along rails 415.

Figure 5A:
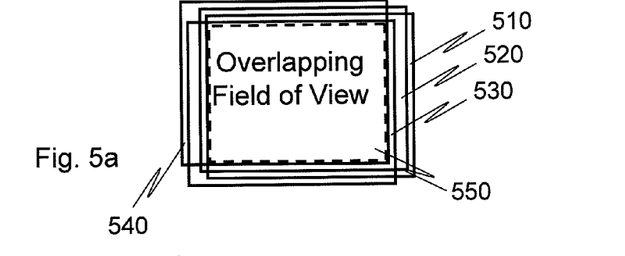
FIG. 5a illustrates mutual alignment of field of view of different camera modules in a first configuration according to an example embodiment of the invention.

FIG. 5a illustrates mutual alignment of field of details of view of different camera modules 232 in a first configuration according to seventh example embodiment of the invention applicable with any one of the first to sixth example embodiments. Each of the camera modules 232 is pointed towards the subject 120 such that the field of view 510, 520, 530, 540 of each camera module 232 is substantially aligned. FIG. 5a exaggerates the difference in alignment of the camera modules 232 for illustrational reasons. Within a region where each field of view overlaps, there is drawn a first view area 550 that has substantially common aspect ratio with the field of view of each camera module. In effect, with the first view area 550 may be digitally enhanced to a resolution higher than that on a single camera module 232 by combining images taken by a plurality of camera modules 232. For instance, as in FIG. 5a there are now four camera modules 232 images covering commonly the first view area, the first view area may be produced with an effective resolution up to quadruple of that of one camera module 232 by use of super-resolution combining of the images of different camera modules 232. It is also appreciated that the resolution of the first view area may be increased by a factor that is less than the number of commonly aimed camera modules 232. This first configuration may also be referred to as a zoom-in configuration as the camera modules produce an effect similar to optically zooming in. It is appreciated that by super-resolution combining of the images as illustrated by FIG. 5a, it may be possible to produce relatively fast zooming. Moreover, such a zooming does not effect on the apertures of the camera modules 232 when zooming.

Figure 5B:
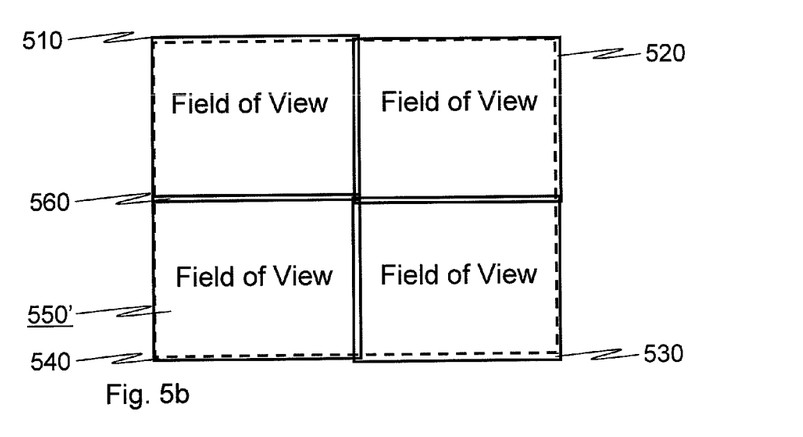
FIG. 5b illustrates mutual alignment of field of view of different camera modules in a second configuration according to an example embodiment of the invention.

FIG. 5b illustrates mutual alignment of field of view of different camera modules in a second configuration according to an eighth example embodiment of the invention applicable with any one of the first to seventh example embodiments (although in turns with the first configuration). In this embodiment, the field of views of adjacent camera modules 232 collectively form a uniform second view area 550' that is substantially equal to the field of view of each camera module 232 multiplied by the number of camera modules. In this case, there are relatively small overlapping areas 560 bridging the fields of view of the different camera modules 232. In producing an image of the second view 550', the overlapping areas may be enhanced by super-resolution. Alternatively, the overlapping areas may be produced by merging the overlapping images such that resolution is maintained at the level of individual camera units.

It is appreciated that the eighth example embodiment may enable making use of parallax difference to calculate a depth map for the image.

Figure 5C:
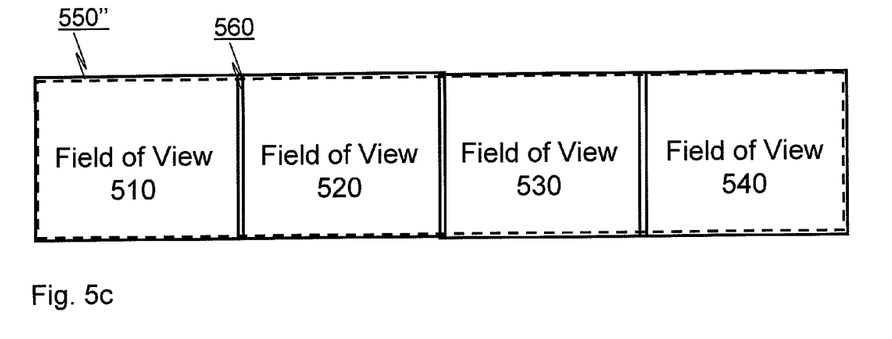
FIG. 5c illustrates mutual alignment of field of view of different camera modules in a third configuration according to an example embodiment of the invention.

FIG. 5c illustrates mutual alignment of field of view of different camera modules in a third configuration according to a ninth example embodiment of the invention applicable with any one of the first to eighth example embodiments (although not necessarily simultaneously with the first and second configurations). In FIG. 5c, the camera modules 232 are aimed such that the fields of view form a continuous band i.e. a panorama picture. FIG. 5c is provided to exemplify embodiments in which at least some of the camera modules are individually adjustable so that the aspect ratio of the collective image. Also as illustrated by FIG. 5c, very wide angle panorama images may be producible be pointing the camera modules to form a panorama image out of plurality of camera module images aligned adjacently. Forming of correspondingly wide panorama image may otherwise require exceptionally wide area lens system and/or stitching of images taken at different times, with higher expense, complexity and/or exposure to movements of the image subject.

Figure 6:
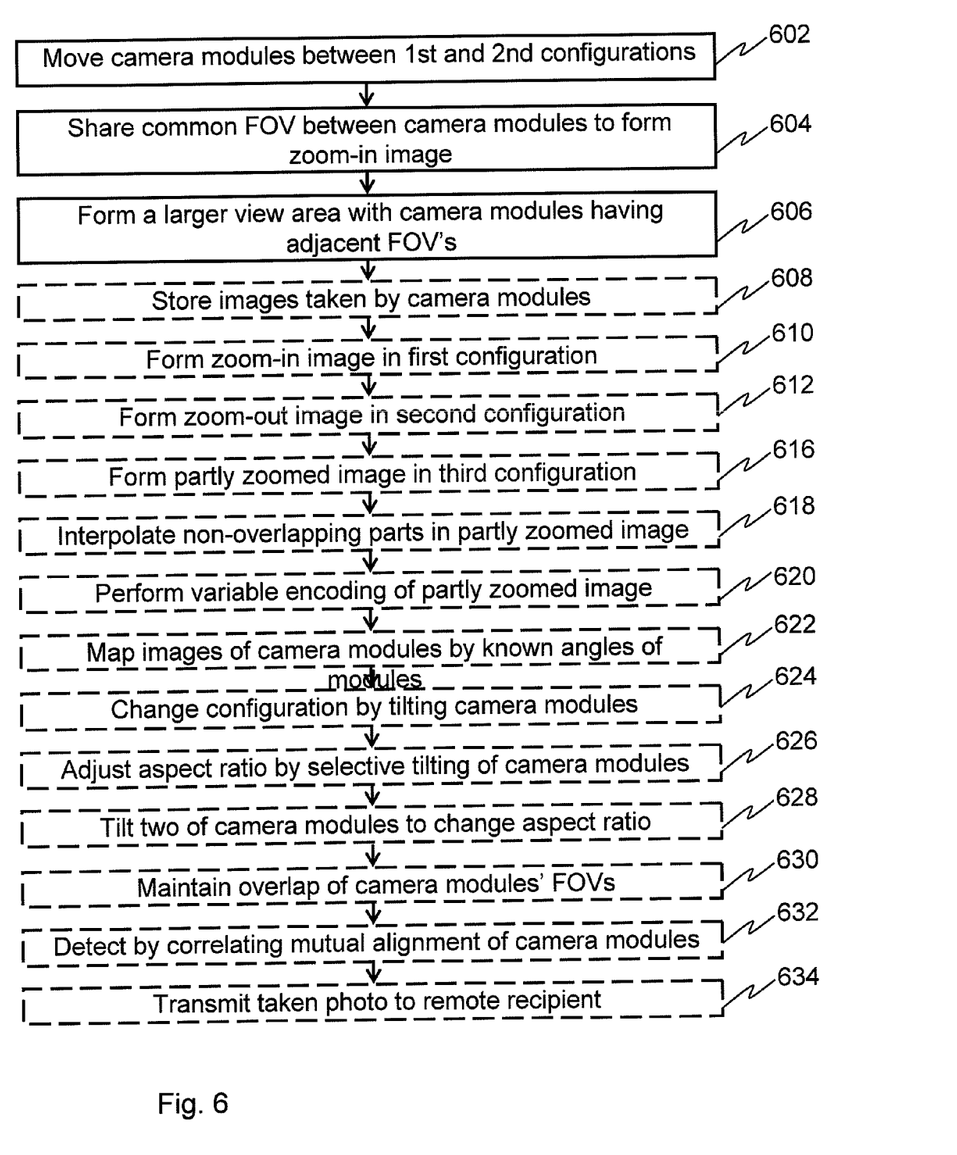
FIG. 6 shows a flow chart of a process in an apparatus according to an example embodiment of the invention.

FIG. 6 shows a flow chart of a process in an apparatus according to a tenth example embodiment of the invention applicable with any one of the first to eighth example embodiments. The process comprises moving 602 camera modules of a set of camera modules between a first configuration and a second configuration, wherein the camera modules are supported on body and each camera module is configured to take images with a first field of view (FOV); and wherein in the first configuration, each camera module shares 604 a substantially common field of view that covers a first view area; and in the second configuration, the fields of view of the camera modules collectively form 606 a second view area that is continuous and covers a second view area, wherein the second view area has common aspect ratio with the first view area and the second view area is larger than the first view area.

According to an eleventh example embodiment of the invention applicable with any one of the first to tenth example embodiments, the process further comprises: 608. storing in a memory images taken by the camera modules; and 610. forming a zoom-in image in the first configuration from the images stored in the memory corresponding to the images of the camera modules using super-resolution combining of the stored images.

According to a twelfth example embodiment of the invention applicable with any one of the first to eleventh example embodiments, the process further comprises: 612. forming a zoom-out image in the second configuration from the images stored in the memory corresponding to the images of the camera modules.

According to a thirteenth example embodiment of the invention applicable with any one of the first to twelfth example embodiments, the camera modules are moved between the first and second configuration 614 via one or more intermediate configurations in which the camera modules collectively produce a partly zoomed image with a third view area that is larger than the first view area and smaller than the second view area.

According to a fourteenth example embodiment of the invention applicable with any one of the first to thirteenth example embodiments, the method further comprises applying 616 super-resolution combining of images taken by the camera modules in overlapping parts of the partly zoomed image within the third view area.

According to a fifteenth example embodiment of the invention applicable with any one of the first to fourteenth example embodiments, the method further comprises applying interpolation 618 to non-overlapping parts of the partly zoomed image in the third view area.

According to a sixteenth example embodiment of the invention applicable with any one of the first to fourteenth example embodiments, the method may further comprise encoding the partly zoomed image with variable resolution 620 so that non-overlapping parts of the partly zoomed image are encoded with a resolution lower than at super-resolution combined parts of the partly zoomed image.

According to a seventeenth example embodiment of the invention applicable with any one of the first to eleventh example embodiments, the forming of the zoom-out image further comprises mapping 622 images taken by different camera modules to a common zoom-out image based on knowledge of relative angles between the different camera modules.

According to a eighteenth example embodiment of the invention applicable with any one of the first to seventeenth example embodiments, the process further comprises tilting 624 the camera modules apart to change the camera modules from the first configuration to the second configuration. The tilting may be configured to take place to corresponding extent in both X and Y directions.

According to a nineteenth example embodiment of the invention applicable with any one of the first to eighteenth example embodiments, the set of camera modules comprises a number of camera modules that is the square of an integer greater than 1. The camera modules may be grouped as a square or as a rectangle.

According to a twentieth example embodiment of the invention applicable with any one of the first to nineteenth example embodiments, the process further comprises adjusting aspect ratio by selective tilting 626 of the camera modules.

According to a twenty-first example embodiment of the invention applicable with any one of the first to twentieth example embodiments, the process further comprises individual tilting 628 of at least two of the camera modules. It is appreciated that to change the aspect ratio, only a sub-set of camera modules may be tilted individually to turn their field of views so that a desired aspect ratio is achieved.

According to a twenty-second example embodiment of the invention applicable with any one of the first to twenty-first example embodiments, the process further comprises maintaining 630, while changing configuration from the first configuration to the second configuration, the field of view of each of the camera modules at least partly overlapping with the field of view of at least one other camera module.

According to a twenty-third example embodiment of the invention applicable with any one of the first to twenty-second example embodiments, the process further comprises correlating 632 the mutual alignment of the fields of view of the different camera modules in the set by correlating overlapping parts of images captured by the camera modules.

According to a twenty-fourth example embodiment of the invention applicable with any one of the first to nineteenth and twenty-second to twenty-third example embodiments, the process further comprises using a single actuator to cause changing of the set of camera modules between the first configuration and the second configuration.

According to a twenty-fifth example embodiment of the invention applicable with any one of the first to nineteenth and twenty-second to twenty-fourth example embodiments, the process further comprises synchronously tilting the camera modules responsive to action of the single actuator.

The camera modules of the set may be hinged at one side and functionally connected to the actuator at opposing side.

According to a twenty-sixth example embodiment of the invention applicable with any one of the first to twenty-fifth example embodiments, the process further comprises obtaining a photo image taken collectively with the camera modules and relaying 634 the photo image to a remote recipient.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. An apparatus comprising:
   a body;
   a set of camera modules mounted on the body, each camera module configured to take images with a first field of view;
   an adjustment mechanism configured to move the camera modules between a first configuration and a second configuration, wherein the adjustment mechanism comprises a single actuator configured to cause changing of the set of camera modules between the first configuration and the second configuration and each of the camera modules of the set being separately hinged on the body at one side of the camera module and functionally connected to the actuator at opposing side of the camera module, wherein:
   in the first configuration, each camera module shares a substantially common field of view that covers a first view area; and
   in the second configuration, the fields of view of the camera modules collectively form a second view area that is continuous and covers a second view area, wherein the second view area has common aspect ratio with the first view area and the second view area is larger than the first view area.

2. The apparatus of claim 1 further comprising:
   a memory configured to store images taken by the camera modules; and
   a processor configured to form a zoom-in image in the first configuration from the images stored in the memory corresponding to the images of the camera modules using super-resolution combining of the stored images.

3. The apparatus of claim 2 wherein the processor is further configured to form a zoom-out image in the second configuration from the images stored in the memory corresponding to the images of the camera modules.

4. The apparatus of claim 1, wherein the adjustment mechanism is further configured to move the camera modules between the first and second configuration via one or more intermediate configurations in which the camera modules collectively produce a partly zoomed image with a third view area that is larger than the first view area and smaller than the second view area.

5. The apparatus of claim 4, wherein processor is configured to apply super-resolution combining of images taken by the camera modules in overlapping parts of the partly zoomed image within the third view area.

6. The apparatus of claim 1 wherein the forming of the zoom-out image further comprises mapping images taken by different camera modules to a common zoom-out image based on knowledge of relative angles between the different camera modules.

7. The apparatus of claim 1 wherein the adjustment mechanism is configured to tilt the camera modules apart to change the camera modules from the first configuration to the second configuration.

8. The apparatus of claim 7 wherein the adjustment mechanism is further configured to adjust aspect ratio by selective tilting of the camera modules.

9. The apparatus of claim 1 wherein the adjustment mechanism is further configured to maintain, while changing configuration from the first configuration to the second configuration, the field of view of each of the camera modules at least partly overlapping with the field of view of at least one other camera module.

10. The apparatus of claim 1 wherein the apparatus is further configured to correlate the mutual alignment of the fields of view of the different camera modules in the set by correlating overlapping parts of images captured by the camera modules.

11. The apparatus of claim 1 wherein the apparatus further comprises a mobile communication circuitry configured to provide mobile communications functions.

12. A method comprising:
moving camera modules of a set of camera modules between a first configuration and a second configuration, wherein the camera modules are supported on a body and each camera module is configured to take images with a first field of view;
changing the set of camera modules with a single actuator adjustment mechanism to move the camera modules between the first configuration and the second configuration, each of the camera modules of the set being separately hinged on the body at one side of the camera module and functionally connected to the actuator at an opposing side of the camera module; and wherein:
in the first configuration, each camera module shares a substantially common field of view that covers a first view area; and
in the second configuration, the fields of view of the camera modules collectively form a second view area that is continuous and covers a second view area, wherein the second view area has common aspect ratio with the first view area and the second view area is larger than the first view area.

13. The method of claim 12 further comprising:
storing in a memory images taken by the camera modules; and
forming a zoom-in image in the first configuration from the images stored in the memory corresponding to the images of the camera modules using super-resolution combining of the stored images.

14. The method of claim 12 further comprising forming a zoom-out image in the second configuration from the images stored in the memory corresponding to the images of the camera modules.

15. The method of claim 14 further comprising moving the camera modules between the first and second configuration via one or more intermediate configurations in which the camera modules collectively produce a partly zoomed image with a third view area that is larger than the first view area and smaller than the second view area.

16. The method of claim 12 further comprising adjusting aspect ratio by selective tilting of the camera modules.

17. A computer executable program stored on a non-transitory memory medium and comprising computer executable program code, which when executed by a computer, causes the computer to:
cause an apparatus to move camera modules of a set of camera modules between a first configuration and a second configuration, wherein the camera modules are supported on body and each camera module is configured to take images with a first field of view;
change the set of camera modules with a single actuator adjustment mechanism to move the camera modules between the first configuration and the second configuration, each of the camera modules of the set being separately hinged on the body at one side of the camera module and functionally connected to the actuator at an opposing side of the camera module; and wherein:
in the first configuration, each camera module shares a substantially common field of view that covers a first view area; and
in the second configuration, the fields of view of the camera modules collectively form a second view area that is continuous and covers a second view area, wherein the second view area has common aspect ratio with the first view area and the second view area is larger than the first view area.

* * * * *